(12) United States Patent
Dvorak

(10) Patent No.: US 8,052,372 B1
(45) Date of Patent: Nov. 8, 2011

(54) WIND TURBINE

(76) Inventor: Jim Dvorak, Cosmos, MN (US)

( * ) Notice: Subject to any disclaimer, the term of this patent is extended or adjusted under 35 U.S.C. 154(b) by 0 days.

(21) Appl. No.: 12/957,599

(22) Filed: Dec. 1, 2010

(51) Int. Cl.
*F03D 3/04* (2006.01)

(52) U.S. Cl. .......................................... 415/2.1

(58) Field of Classification Search .............. 415/2.1, 415/3.1, 4.1, 4.2, 4.3, 4.4, 4.5, 57.3, 54.1, 415/905, 906, 907, 908
See application file for complete search history.

(56) References Cited

U.S. PATENT DOCUMENTS

| | | | | |
|---|---|---|---|---|
| 1,315,595 A | * | 9/1919 | Clark | 415/4.4 |
| 4,191,505 A | * | 3/1980 | Kaufman | 415/2.1 |
| 5,332,354 A | | 7/1994 | Lamont | |
| 5,447,412 A | | 9/1995 | Lamont | |
| 7,182,573 B2 | * | 2/2007 | Jonsson | 415/906 |
| 7,365,448 B2 | | 4/2008 | Stephens | |
| 7,781,905 B2 | | 8/2010 | Newman | |
| 2006/0275122 A1 | | 12/2006 | Kilaras | |

FOREIGN PATENT DOCUMENTS

JP 52001251 A * 1/1977

\* cited by examiner

*Primary Examiner* — Richard Edgar
(74) *Attorney, Agent, or Firm* — Nikolai & Mersereau, P.A.; C. G. Mersereau

(57) ABSTRACT

A wind driven turbine device is disclosed that includes a housing having an air inlet and an air outlet, a turbine rotor having a plurality of radially distributed turbine rotor blades mounted in the housing for rotation in direct response to atmospheric wind to thereby generate rotary power, a baffle arrangement is also provided for directing wind through the housing from the air inlet to contact the turbine rotor blades from behind as internal driving wind. The rotor is mounted in a manner such that the rotor blades are driven both by a combination of direct external wind and internally directed wind.

5 Claims, 2 Drawing Sheets

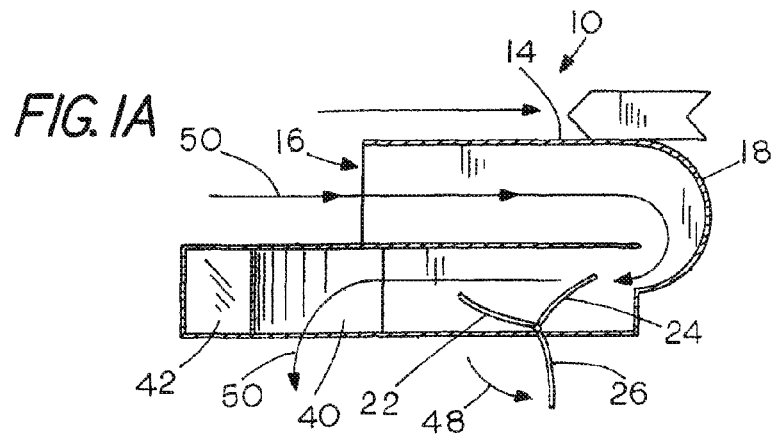
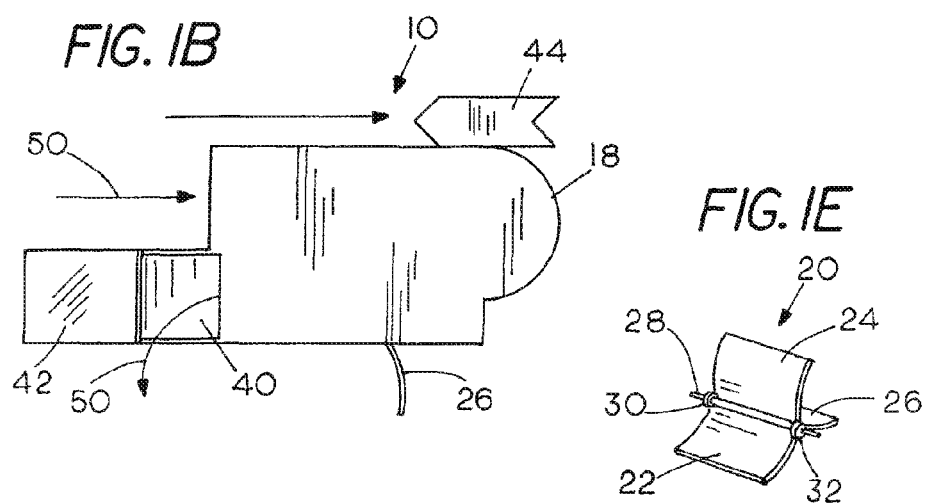
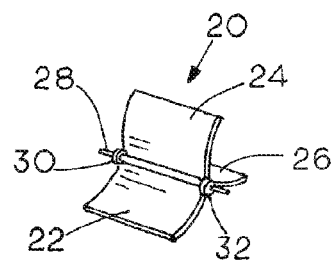
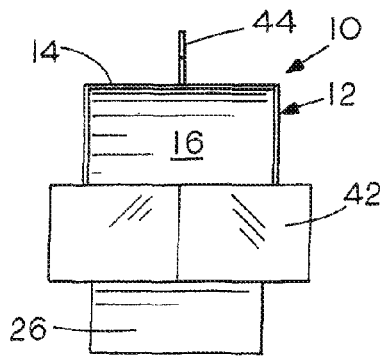
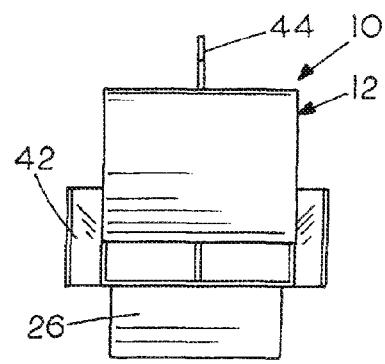

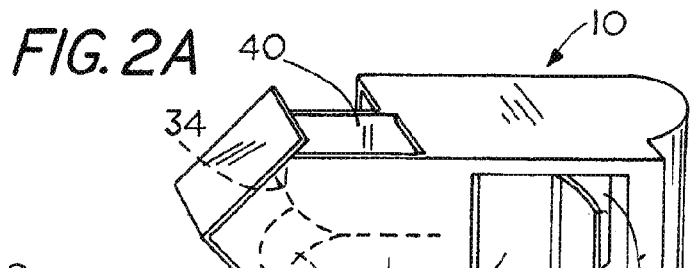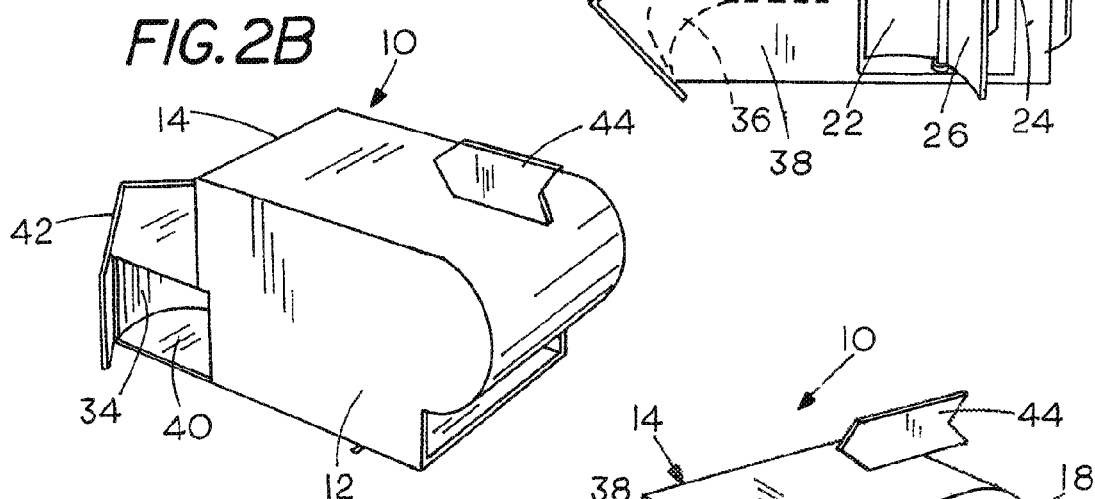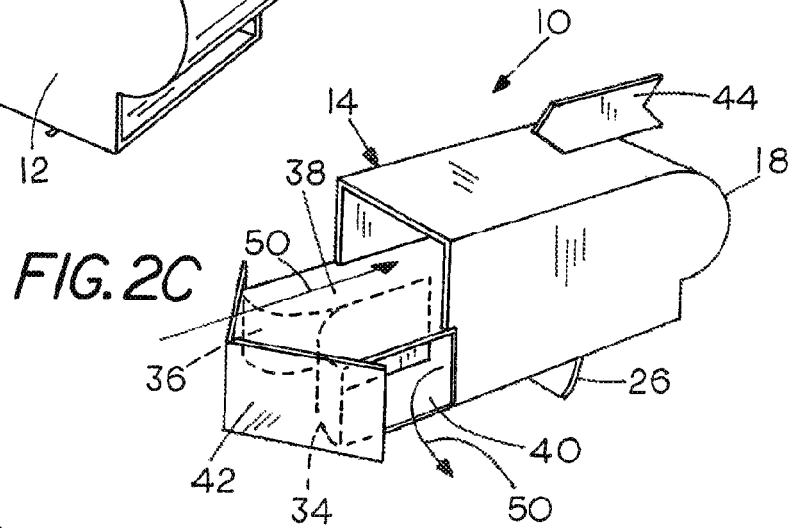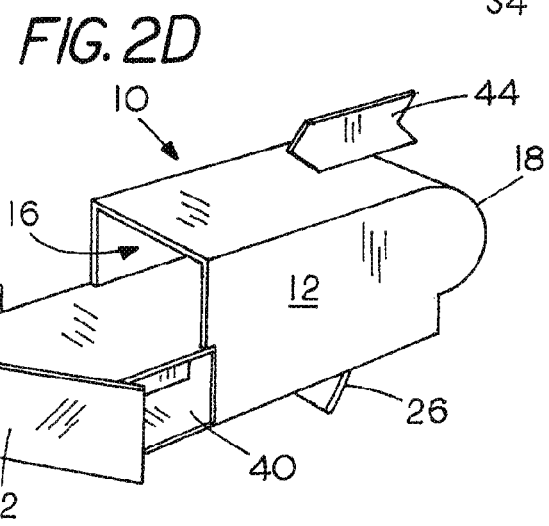

US 8,052,372 B1

WIND TURBINE

CROSS-REFERENCED TO RELATED APPLICATIONS

Not applicable

STATEMENT REGARDING FEDERALLY SPONSORED RESEARCH OR DEVELOPMENT

Not applicable

BACKGROUND OF THE INVENTION

I. Field of the Invention

The present invention relates generally to wind driven turbine devices and, more particularly, to a compact wind driven turbine device that combines external and internal airflow to propel the turbine blades in an efficient manner. The turbine system is compact and may be constructed in any desired size. The turbine is designed to power a corresponding electric generator.

II. Related Art

Wind driven generators have been known in the art for some time. Wind driven turbines having rotating enclosures that sense and seek the wind direction and align an enclosure inlet with the prevailing wind direction have also been made. Such devices having housings with internal turbines such that the wind is channeled to drive a turbine rotor which may have a plurality of blades or rotor vanes is also known. Such an arrangement is shown, for example, in U.S. Pat. Nos. 5,332,352 and 5,447,412 to Lamont which include primary and secondary air inlets and a horizontally mounted squirrel cage turbine device which has a plurality of vertical rotor vanes.

Despite the many varied wind driven turbine devices which have been devised to generate electric power, there remains a need for an inexpensive compact efficient turbine system which has a minimum of moving parts and uses a simplified construction.

SUMMARY OF THE INVENTION

The present invention is directed to a wind driven turbine system of simplified construction which enables low cost efficient wind turbine devices to be produced for individual or small scale use. Larger units can also be constructed.

The system includes a wind driven turbine device which includes a generally hollow housing having an air inlet opening and one or more outlets or exhaust ports. A turbine rotor is provided which has a plurality of radially distributed turbine rotor blades and which is mounted in the housing for rotation in response to atmospheric wind to rotate an output shaft designed to be coupled to a generator for generating power. The housing includes a baffle arrangement for directing wind through the housing from the air inlet opening to contact the turbine rotor blades internally in a back-to-front direction. The turbine rotor is mounted such that the rotor blades are also driven by direct external wind, the two wind sources combining to produce an efficient rotor driving system.

Preferably the rotor blades have a concave side and a convex side and the external wind and the internal wind address and exert force on the concave side of consecutive rotor blades as the turbine rotor revolves. The internally directed air after encompassing a blade is exhausted through ports beyond the blades which are defined by additional internal baffles. A forward wind deflector or shield protects the exhaust ports from oncoming wind and there is provided one or more directional fins or other conventional means for aligning the turbine system into the wind. The rotor is mounted to rotate a shaft which is mounted using suitable bearings which produce a very quiet efficient operation.

Preferably the housing and rotor are fabricated of relatively lightweight materials to facilitate directional operation of the device and to reduce the force necessary to rotate the rotor. The housing may be of sheet metal and the rotor blades of a lightweight sheet metal such as aluminum. Suitable plastics may also be used in the construction of the device.

BRIEF DESCRIPTION OF THE DRAWINGS

FIG. 1A is a side elevational schematic view of a wind driven turbine system in accordance with the invention shown with parts removed to illustrate air flow;

FIG. 1B is a side elevational schematic view of the wind driven turbine system of FIG. 1A;

FIGS. 1C and 1D are front and rear elevational views of the turbine system of FIG. 1A;

FIG. 1E is a perspective view of a turbine blade suitable for use in the invention;

FIG. 2A is a bottom perspective view of the turbine system of the invention;

FIG. 2B is a rear perspective view; and

FIGS. 2C and 2D are front perspective views, FIG. 2C showing an internal exhaust baffle construction.

DETAILED DESCRIPTION

The following detailed description is given as an example to illustrate the inventive concepts and is not intended to limit the scope of the invention. Variations may occur to those skilled in the art that remain within the contemplated scope of the invention.

In FIGS. 1A-1E and 2A-2D, there is shown a set of schematic views of a wind turbine in accordance with one preferred embodiment of the present invention. The turbine is shown generally at 10 and includes a generally hollow primary housing 12 which may be manufactured from sheet metal, a suitable plastic material or any other type of construction material suitable for the intended use. In this regard, lightweight materials may be preferred to enable the structure to be more responsive to changes in wind direction. The housing includes a top or upper section 14 that includes an air inlet opening or cowling 16 in an arcuate-shaped direction reversing baffle is shown at 18. The turbine includes a rotor 20 with arcuate-shaped blades 22, 24 and 26. The rotor is mounted to rotate a suitable output shaft 28 which is mounted for rotation using suitable bearings as at 30 and 32. The shaft 28 is designed to be coupled to drive an electric generator (not shown) in a well known manner. The generator itself does not form part of the present invention and such hookups to turbines are well known in the art and need no further explanation.

The wind turbine further includes a pair of forward exhaust baffles 34 and 36 which define exhaust ports for exhausting internally-directed air at 38 and 40. A front deflector plate is shown at 42. A directional fin is shown at 44. It should be noted that the wind turbine system can be mounted at any height or angle that will successfully catch the prevailing wind. The wind turbine system of the invention can even be mounted on a vehicle to provide an additional source of electric power.

As can readily be appreciated from the drawing figures, direct external wind exerts a force against the blade 26 as shown by the arrow 48 while at the same time, the internally directed air exerts a force against the blade 24 as shown by the arrows 50 thereby, in effect, doubling the effect of the prevailing wind without creating any drag on the rotor blades, this enables the turbine system of the invention to be a compact highly efficient system using a fairly simple construction.

The turbine rotor 20, like the housing 12, is preferably constructed from a lightweight sturdy material such as aluminum or a high-impact plastic material and may even be molded as a single-piece construction. While three blades are shown in the illustrated embodiment, it will be appreciated that the number and shape of the blades used may vary so long as the ability to utilize both internal and externally supplied air is maintained.

It will also be appreciated that the wind turbine system of the invention can be made in any desirable size and its efficiency makes it especially adaptable to provide electric power on a relatively small scale as to individual installation such as homes or farms.

This invention has been described herein in considerable detail in order to comply with the patent statutes and to provide those skilled in the art with the information needed to apply the novel principles and to construct and use embodiments of the example as required. However, it is to be understood that the invention can be carried out by specifically different devices and that various modifications can be accomplished without departing from the scope of the invention itself.

What is claimed is:

1. A wind driven turbine device comprising:
   (a) a housing having an air inlet and an air outlet;
   (b) a turbine rotor having a plurality of radially distributed turbine rotor blades mounted in the housing for rotation in response to atmospheric wind to thereby generate rotary power;
   (c) a baffle arrangement for directing wind through the housing from the air inlet to contact said turbine rotor blades as internal driving wind;
   (d) wherein said rotor is disposed in a manner such that the rotor blades are driven both by a combination of direct external wind and internally directed wind and wherein said internally directed wind encounters said blades in a direction opposite of said external wind; and
   (e) exhaust ports in said housing for exhausting said internally directed wind wherein said exhaust ports direct said internal wind out of the path of said direct external wind.

2. A wind driven turbine device as in claim 1 wherein said rotor blades have a concave side and a convex side and the external wind and the internal wind address the concave side of consecutive rotor blades.

3. A wind driven turbine device as in claim 1 wherein said exhaust ports include an internal baffle arrangement.

4. A wind driven turbine device as in claim 1 further comprising a wind deflection member associated with said exhaust ports.

5. A wind driven turbine device as in claim 2 wherein the rotor consists of three blades.

* * * * *